United States Patent [19]
Wokan et al.

[11] Patent Number: 4,899,623
[45] Date of Patent: Feb. 13, 1990

[54] CONTROL SYSTEM FOR INTERNAL COMBUSTION ENGINES

[75] Inventors: Andreas Wokan, Darmstadt; Kurt Probst, Schwalbach; Klaus Bluhm, Steinbach; Manfred Pfalzgraf, Frankfurt am Main, all of Fed. Rep. of Germany

[73] Assignee: VDO Adolf Schindling AG, Frankfurt am Main, Fed. Rep. of Germany

[21] Appl. No.: 203,393

[22] Filed: Jun. 6, 1988

[30] Foreign Application Priority Data

Jun. 13, 1987 [DE] Fed. Rep. of Germany ....... 3719812

[51] Int. Cl.$^4$ .............................................. B60K 41/18
[52] U.S. Cl. ...................................... 74/860; 123/399; 123/350
[58] Field of Search ................. 74/866, 860, 859, 857, 74/858, 875, 876; 180/177, 179; 123/399, 350

[56] References Cited

U.S. PATENT DOCUMENTS

| 2,737,059 | 3/1956 | Perkins | 74/859 |
| 4,226,141 | 10/1980 | Espenschied | 74/860 X |
| 4,453,516 | 6/1984 | Filsinger | 123/399 X |
| 4,691,676 | 9/1987 | Kikuchi | 123/399 |
| 4,756,378 | 7/1988 | Takei | 123/350 X |
| 4,765,296 | 8/1988 | Ishikawa et al. | 123/399 |

FOREIGN PATENT DOCUMENTS

| 0045962 | 2/1982 | European Pat. Off. | 74/859 |
| 2022768 | 11/1970 | Fed. Rep. of Germany | 74/860 |
| 0058131 | 4/1984 | Japan | 123/399 |

Primary Examiner—Dirk Wright
Attorney, Agent, or Firm—Martin A. Farber

[57] ABSTRACT

A control system for an internal combustion engine comprises an electronic controller unit (3) which evaluates signals of a speed transmitter (8) and, upon reaching a predetermined maximum speed, displaces, via a controlling element (4), a displacement device (7) which is provided for the regulating of the engine output. In order to make the intermediate giving of gas possible even upon reaching the maximum speed and thus upon the downward regulation of the engine output, there is provided a neutral position recognition switch (10) which in the neutral position of the transmission (9) feeds a signal to the controller unit (3), which signal is so processed in a recognition circuit of said controller unit that the speed limitation is placed out of operation. At the same time, a position limitation of the controlling element is established in order to permit a load-free speeding up of the internal combustion engine in order to reach the shift speed of rotation, and at the same time, however, prevent exceeding of the speed limitation.

2 Claims, 2 Drawing Sheets

CONTROL SYSTEM FOR INTERNAL COMBUSTION ENGINES

FIELD AND BACKGROUND OF THE INVENTION

The invention relates to a control system with a controlling element for controlling the output of an internal combustion engine followed by manual transmission, in which signals can be fed to the control system from a speed transmitter in order to limit the maximum speed of a vehicle driven by the internal combustion engine.

In control systems such as are present, for instance, in the case of an electric gas pedal with vehicular speed speed limitation, it may be necessary, under certain conditions, that the limiting be temporarily done away with and/or replaced by a different limit. This is true in the case of vehicles with unsynchronized manual transmissions in which, in order to shift to a lower gear, the gearwheels in the transmission on the drive side and the driven side must be brought to the same peripheral speed in order to make smooth engagement possible. This is effected by "the intermediate giving of gas" in the neutral position of the transmission without the clutch being disengaged.

If the vehicle is at its maximum permissible speed and if the power controlling member is adjusted downward by the control system as a result of a corresponding signal from a speed transmitter, then it is not possible for the driver to shift back into a lower gear since the controlling element does not permit an intermediate giving of gas, as a result of the downward regulation which has been carried out. Down shifting at such high vehicular speeds into a lower gear may be necessary in the case of large downgrades. After a few seconds, however, in the case of an unsuccessful attempt, the shifting into the previous gear is also no longer possible since such a low speed of rotation has been regulated down in the meantime on the internal combustion engine that the peripheral speeds of the gears which comes into engagement with each other are again not adapted to each other. In this case the braking power of the internal combustion engine cannot be utilized and the driver of the vehicle is dependent in this condition solely on the brake system, which can lead to critical situations on longer downgrades.

SUMMARY OF THE INVENTION

It is an object of the invention to make possible the shifting of the transmission with intermediate gas despite vehicular speed limiting upon the regulation of the output of the internal combustion engine.

Accordingly, by the invention a neutral-position recognition switch (10) is provided on the transmission in order to determine the neutral position, and the control system has a recognition circuit which eliminates the vehicle speed limitation when a neutral-position signal is present.

By the invention it is possible, despite the presence of the speed limiter in the active limiting function to bring the internal combustion engine in the neutral position of the transmission to a higher speed of rotation than corresponds to the vehicular speed which is permitted by the vehicular speed limitation by the intermediate giving of gas.

In order to avoid a manipulation by application of a suitable voltage to the neutral recognition input of the control system so that the speed limiting would be eliminated also during travel, measures are proposed, in a further development of the invention, wherein, in the event of the presence of a neutral position signal, there is set a position limitation of the controlling element which corresponds to a limiting of output for the internal combustion engine which corresponds to the desired vehicular speed limitation.

In this way, to be sure, the load-free speeding up of the internal combustion engine in order to reach the shift vehicular speed of rotation is possible, but going beyond the speed limitation is excluded due to the fact that the necessary power of the internal combustion engine is not available. In this case the setting movement of the controlling element is so limited that while a speeding up of the internal combustion engine in load-free condition is possible, however when the internal combustion engine is placed under load this position of the controlling element, for instance 25% of the total setting path, is not sufficient in order to exceed the permitted maximum vehicular speed.

The invention is, of course, not limited to use in automotive vehicles but can be employed wherever an internal combustion engine with subsequent transmission is used to drive vehicles of any type or else for the driving of units in connection with which certain speeds of rotation are not to be exceeded.

BRIEF DESCRIPTION OF THE DRAWING

With the above and other objects and advantages in view, the present invention will become more clearly understood in connection with the detailed description of a preferred embodiment, when considered with the accompanying drawing, of which.

DETAILED DESCRIPTION OF THE PREFERRED EMBODIMENT

Figure 1:
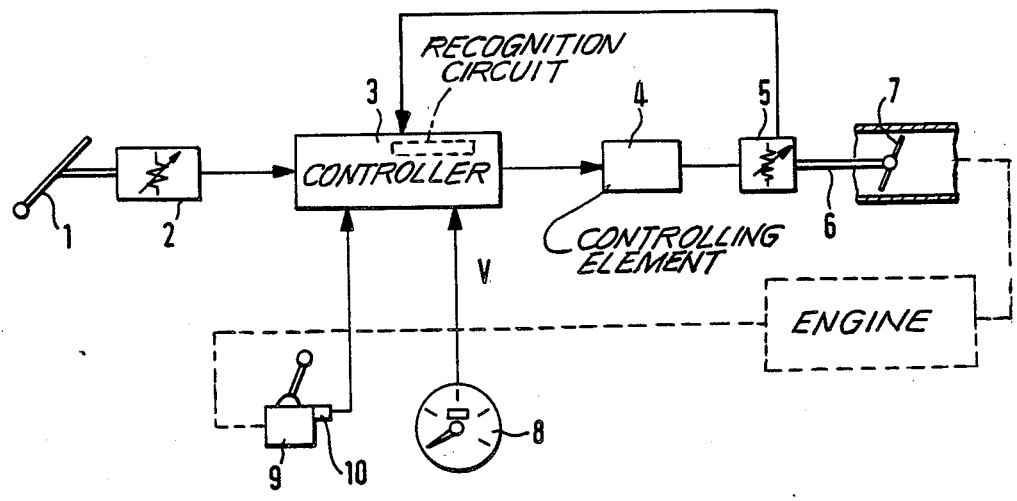
FIG. 1 is a block diagram of an electric gas pedal system.

Referring to the drawing, a controller system, in the present example an electric gas-pedal system, comprises a gas pedal 1, a desired-value transmitter 2, an electronic controller unit 3, a controlling element 4, a place-value reporter 5, a transfer unit 6 and a displacement device 7 developed as throttle valve for controlling the output of the internal combustion engine.

A signal proportional to the vehicular speed is fed by a speed transmitter 8 to the controller unit 3 in which the actual vehicular speed is compared with a predetermined maximum value. When this maximum value is reached, the controlling element 4 is moved back to such an extent that the exceeding of this maximum speed is not possible.

In order now to make it possible nevertheless to give intermediate gas in such a downward regulation process, so that when the gears are not synchronized the gearwheels which are to be brought into engagement with each other can be brought to the same peripheral speed, there is provided on the transmission 9 a neutral-position recognition switch 10 which, in the neutral position of the transmission gives off a corresponding signal to the controller unit 3. The latter has a corresponding recognition circuit which operates to eliminate the speed limitation as the result of corresponding signals which are given off by the speed transmitter 8.

In order that an undesired manipulation by the applying of a corresponding voltage to the neutral recognition input and thus an elimination of the speed limiting is avoided, the controller unit 3 is equipped with a corresponding circuit which, in the presence of a neutral position signal, effects a limiting of the position of the controlling element 4 in the manner that while a load-free speeding up of the engine to reach the shift speed of rotation is possible, exceeding the speed limitation is not possible.

Figure 2:
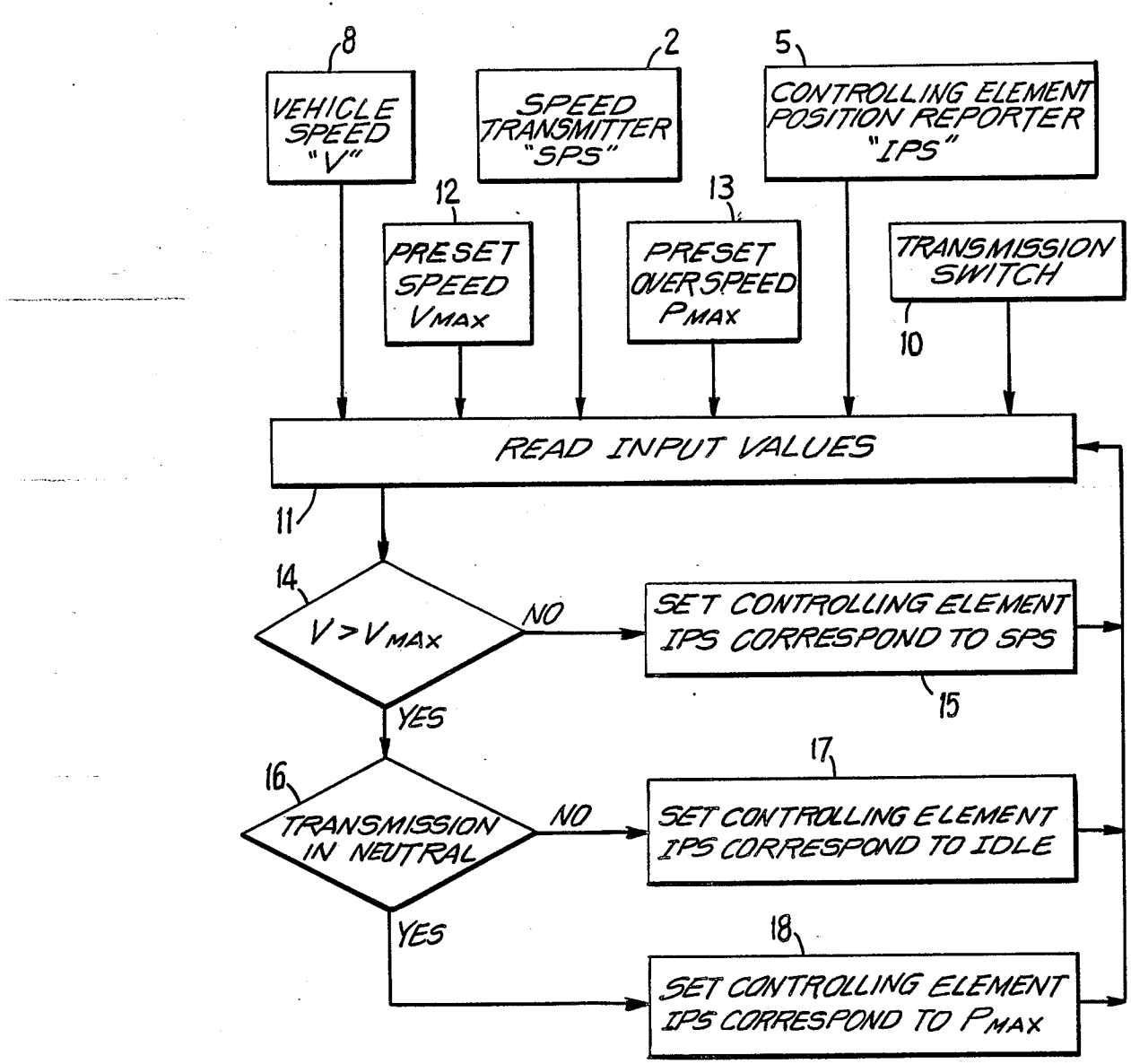
FIG. 2 is a flow chart of a controller of FIG. 1.

The operation of the controller unit 3 to carry out the speed control of the invention is explained in the flow chart of FIG. 2. The recognition circuit and other parts of the controller are embodied in a computer which functions in accordance with the flow chart. The operation begins at block 11 with a reading of input signal values from components of the system of FIG. 1, namely, vehicular speed from the speed transmitter 8, desired speed from the transmitter 2, the position of the controlling element 4 as provided by the reporter 5, and the transmission gear status as reported by the neutral switch 10. Also provided to the computer are a preset maximum value of vehicular speed, from block 12, and a preset value of controller element position allowing for overspeed of the engine, from block 13, for engagement of gears as the transmission passes through neutral.

The operation continues at block 14 wherein present vehicular speed is compared with the maximum permissible speed. If the maximum speed has not been exceeded, then the controller unit 3 outputs a command signal to the controlling element 4 to set its position, block 15, in correspondence with the requested speed of the transmitter 2.

In the event that the vehicular speed exceeds the maximum speed, block 14, then a check is made, at block 16, to determine if the transmission is in neutral. If the transmission is not in neutral, but engaged in a gear, then the controller unit 3 outputs a command signal to the controlling element 4 to set is position, block 17, for idle speed, thereby to allow maximum engine braking so as to slow the vehicle.

If the transmission is in neutral, block 16, then the controller unit 3 outputs a command signal to the controlling element 4 to set its position, block 18, for increasing the speed of the engine above normal operating speed limit so as to attain a smooth engagement of gears in a down shifting of gears. The down shifting is performed when the vehicle is to proceed down a steep slope, the down shifting providing increased engine braking.

The computer of the controller unit 3 continuously recycles through the flow chart and, therefore, responds immediately to an action of the switch 10 indicating that the transmission has switched from neutral into gear. Then at block 16, the operation proceeds to block 17 to reduce the commanded engine speed from the overspeed situation to idle speed. The command for idle speed occurs in the down-shifted condition, thereby to attain maximum engine braking.

We claim:

1. In a control system with a conotrolling element for controlling the output of an internal combustion engine followed by transmission for driving a vehicle, the system including a controller responsive to the position of a gas pedal for driving the controlling element for vehicle speeds below a maximum speed limitation, wherein signals are fed to the control system from a speed transmitter in order to implement the maximum speed limitation of the vehicle independently of the position of the gas pedal, the improvement wherein the system comprises a recognition circuit, there being a neutral-position recognition switch provided on the tranmission in order to determine the neutral position, the recognition circuit eliminating the speed limitation when a neutral-position signal is presented by the switch to allow activation of the controlling element in response to the gas pedal for vehicle speeds in excess of the speed limitation.

2. A system according to claim 1, wherein
   in the event of the absence of a neutral position signal, the recognition circuit is operative to set a position limitation of the controlling element to limit the output of the internal combustion engine in correspondence with the desired speed limitation.

* * * * *